United States Patent [19]

Loeffler et al.

[11] 4,304,177
[45] Dec. 8, 1981

[54] FOOD COOKING APPARATUS

[75] Inventors: Herbert H. Loeffler, Arlington; Samuel W. Tishler, Bolton, both of Mass.

[73] Assignee: Arthur D. Little, Inc., Cambridge, Mass.

[21] Appl. No.: 124,091

[22] Filed: Feb. 25, 1980

[51] Int. Cl.³ .............................................. A47J 27/00
[52] U.S. Cl. ........................................ 99/333; 99/348; 99/427; 126/338; 219/433; 366/148; 366/220
[58] Field of Search ................. 99/325, 332, 333, 364, 99/390, 391, 393, 395, 397, 401, 403, 409, 413, 414, 427, 348; 126/338; 219/144–146, 433, 435, 439; 366/144–146, 220

[56] References Cited

U.S. PATENT DOCUMENTS

| | | | |
|---|---|---|---|
| 1,351,394 | 8/1920 | Martin | 126/338 |
| 2,700,097 | 1/1955 | Morey | 219/433 |
| 3,176,968 | 4/1965 | Appleton | 366/146 |
| 3,678,248 | 7/1972 | Tricault | 219/433 UX |
| 3,691,935 | 9/1972 | Spetz | 99/391 X |
| 3,952,538 | 4/1976 | Warlick | 366/144 X |
| 4,120,981 | 10/1978 | Burkhart | 99/348 X |

*Primary Examiner*—Philip R. Coe
*Assistant Examiner*—Arthur O. Henderson
*Attorney, Agent, or Firm*—Richard J. Hammond

[57] ABSTRACT

An automatic cooking apparatus wherein a rotating wide-mouthed vessel closed with a lid is supported in a stationary, handle-equipped basket frame by the frame and the lid which engages driving means. Heating means are provided along a portion of the vessel circumference and are controlled to maintain food contained within the vessel at a predetermined temperature for a preset time. Means are provided to sense the temperature of the cooking food and to generate a signal to which both temperature controlling and timing means are responsive. In one embodiment of the apparatus microprocessing control means are used to achieve a desired cooking protocol.

37 Claims, 23 Drawing Figures

FOOD COOKING APPARATUS

This invention relates to food cooking apparatus and more particularly to apparatus of the type wherein the food to be cooked is placed within a rotating vessel that is exposed to an external heat source to produce a predetermined temperature within the vessel for a preset time.

The ability to precisely control the temperature of foods being cooked as well as the time of cooking them has long been recognized as the ultimate goal in preparing foods simply, economically and consistently well. Since foods being cooked represent a mass (i.e., a liquid of varying viscosity, a solid, or a mixture of these) of generally poor heat transfer qualities, it is also necessary for the successful preparation of foods to be able to achieve uniform heating throughout the mass, normally by stirring. Finally, in some cooking protocols it may be necessary or desirable to achieve a predetermined temperature cycling, e.g., slow or rapid heating followed by a period of uniform temperature and terminated by slow or rapid cooling. Such protocols are difficult if not impossible to achieve for the average cook, who finds it hard enough to keep food from sticking and perhaps burning.

In U.S. Pat. Nos. 4,048,473 and 4,120,981 there are disclosed a cooking machine and a cooking method designed to cook a wide variety of foods rapidly, simply, efficiently, tastefully and largely automatically. The apparatus and method disclosed in U.S. Pat. Nos. 4,048,473 and 4,120,981 attain a uniform desired temperature throughout the food mass, eliminate stirring, and make possible the preparation of such diverse dishes as beef stroganoff, asparagus with hollandaise sauce, french fried potatoes, egg dishes and souffles to be cooked as one-step operations. The cooking machine of this prior art comprises a rotatable, inclined cooking vessel having a removable cap with a central, vapor discharging opening near which or through which a temperature probe is located. The vessel is rotated past a heating element by an electric motor. A timing mechanism initiated by signals from the temperature probe turns off the electric motor and heating element after a preset time.

Two apparatus embodiments are illustrated in U.S. Pat. No. 4,048,473. In the first of these, shown in FIGS. 1-5 of the patent, the cooking vessel is placed within an essentially closed cylindrical housing having a small window for viewing the vessel contents during cooking. The vessel is supported within the housing on bearings at its capped end and by the drive motor shaft keyed to its bottom end. Thus, although the vessel has an adequate support during rotation, it is difficult (if not impossible) to visually inspect the food during cooking, it is very difficult to remove the hot vessel from the housing when cooking is complete and it is necessary to hold the vessel, normally with both hands, in moving it and discharging its contents.

The second apparatus embodiment of U.S. Pat. No. 4,048,473, shown in FIGS. 6-8 of that patent, provides a heat reflective housing supporting heating coils and enveloping up to about 120° of the circumference of the cooking vessel. The vessel is supported on two idler wheels and two motor driven gears driving a central gear affixed to the cap of the vessel. The vessel may have a dovetail ring affixed to its external surface to which a handle may be attached when the vessel is not rotating. Thus, although this second embodiment makes it possible to use a glass cooking vessel that permits full visual inspection of the food contained within, this advantage is achieved at the expense of an adequate, stable support system; for the two idler wheels and the two gears provide no assurance that the hot vessel and its contents would remain safely positioned and not be subject to dislodgment by bumping or jarring. A ring is disclosed for attaching a handle, but this involves the necessity to keep at hand a loose part as well as the need to perform another step in the use of the cooking apparatus.

Therefore, although the cooker embodiments of U.S. Pat. No. 4,048,473, provide the means for efficiently cooking all manner of dishes, the apparatus does not possess a preferred combination of features: visual inspection of the food while cooking, a stable, sturdy and accident-proof support system for the cooking vessel, and a permanent continuously cool handle means for ease of engaging and disengaging the cooking vessel and driving means and for moving the cooking vessel from place to place.

It is therefore a primary object of this invention to provide an improved general purpose cooker capable of cooking a wide range of foods easily, reliably and automatically by rotating the food in a vessel while heating its contents and controlling the heat input to control the temperature of the food during cooking. It is another object to provide a cooker of the character described which may incorporate a transparent cooking vessel (formed, for example, of glass) permitting visual inspection of the cooking process and which has a reliable, automatically alignable locking support means for the vessel. It is yet another object to provide such a locking support means which incorporates a nonrotating basket frame having handle means to permit the cooking vessel to be put into and taken from the cooker and to be moved around without touching the surface of the vessel. An additional object is to provide means associated with the handle to retain the vessel in the basket frame means while pouring from the vessel.

Another primary object of the invention is to provide a cooker of the character described which comprises a single compact unit, which protectively seals off the driving means and all electronic circuitry from cooking vapors and which is easily washed. Yet another object is to provide an automatic cooker which permits the ready exchange of cooking vessels so that different courses or different parts of a single course can be cooked successively.

Still another primary object of this invention is to provide an automatic cooker having accurate control of cooking times and temperatures and being capable of carrying out a preset cooking protocol. An additional object is to provide such an automatic cooker incorporating microprocessor means activated and controlled by an appropriate signal generating means such that once the ingredients of a recipe are charged into the cooking vessel a single actuation of the apparatus will suffice to perform the protocol.

Other objects of the invention will in part be obvious and will in part be apparent hereinafter.

The invention accordingly comprises the features of construction, combination of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings in which.

According to one aspect of this invention there is provided an automatic food cooker comprising an open-mouthed, rotatable cooking vessel, the bottom of which has a centrally positioned internally-directed indentation; driving means to rotate the vessel; vessel lid means arranged to be directly engageable with the driving means to rotate the vessel; housing means having a drive housing end in which the driving means is located, being configured to envelope a portion of the circumference of the vessel when engaged for rotation, and having a heat reflective surface facing the vessel; vessel heating means mounted in the housing means; basket frame means surrounding the vessel and having a longitudinally extending handle; means to engage the basket frame means with the housing means to lock the vessel into engagement with the drive means, and a centrally positioned bottom projection engageable with the wall of the vessel indentation, whereby the engagement of the basket frame projection and the vessel indentation in conjunction with the engagement of the lid means with the drive means provides support for the vessel during rotation; temperature sensing means including a temperature probe extending from the drive housing through the lid means to sense the temperature of food within the vessel and to develop a signal indicative of the temperature; and programable temperature/elapsed time control means responsive to the temperature signal to control the heater means.

According to another aspect of this invention there is provided an automatic food cooker which incorporates microprocessing control means programable and/or programed to carry out a predetermined cooking protocol for preparing a wide range of foods.

Figure 1:
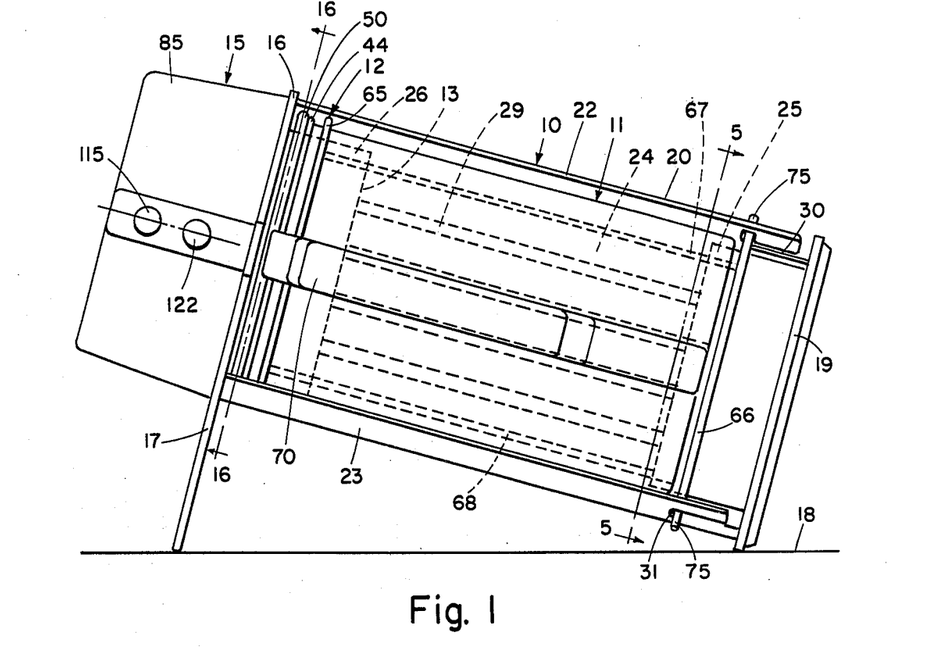
FIG. 1 is a side elevational view of one embodiment of the cooker of this invention.
Figure 2:
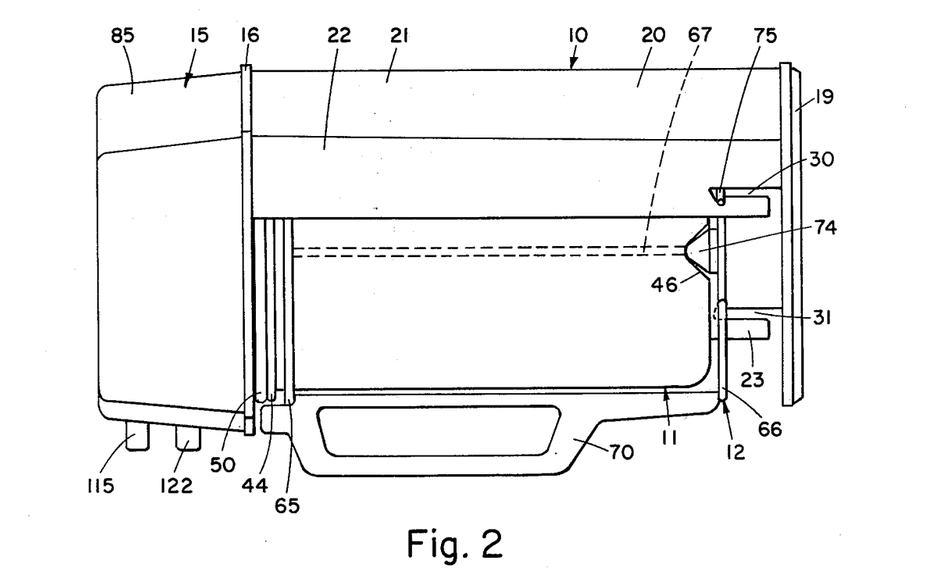
FIG. 2 is a top elevational view of the cooker of FIG. 1.

FIGS. 1 and 2 are side and top elevational views, respectively, of one embodiment of the automatic cooker of this invention. Since the various components of this cooker embodiment are shown in FIGS. 3-19, in which the same reference numerals are used to identify the same components and their parts, reference should also be had to those figures. The cooker of FIGS. 1 and 2 is formed of a housing means 10, a wide-mouth cooking vessel 11, a cooking vessel basket frame 12, and heating means 13 positioned along the internal wall of the side of housing means 10.

Figure 3:
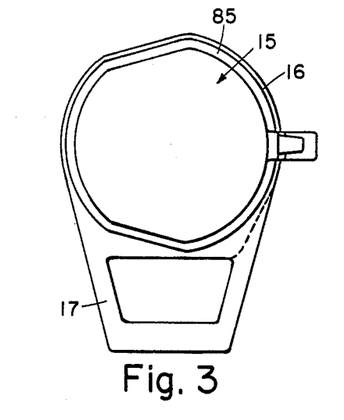
FIG. 3 is an end view of the motor-drive end of the apparatus of FIG. 1.

Housing means 10 comprises a motor drive housing 15 terminating in an end wall 16 which may, as shown in FIG. 3, have a cooker support extension 17 of a height to maintain the cooker at a small (up to about 15°) angle with a horizontal surface 18 on which it rests. Opposite the motor drive housing is an end wall 19 and the two end walls 16 and 19 are joined by a central housing member 20 which is configured to envelope up to about 180° of the circumference of vessel 11 when placed in the housing. As will be seen in the transverse cross sectional view of FIG. 4, central housing member 20 is formed of an outer arcuate section 21 with an upper extension wall 22 and lower extension wall 23. The internal surface 24 of arcuate section 21 is heat reflective. At the two ends of central housing member 20 are arcuate bands 25 and 26 defining a section of an essentially annular spacing 27 with central housing walls 21, 22 and 23. A slotted support plate 28 is positioned within this spacing to provide means to support heating elements 29. These heating elements are preferably of a type which rapidly develops radiant heat. Quartz tubes containing Nichrome wire are exemplary of such elements. An identical arrangement is provided at the drive housing end of the housing as will be seen in FIG. 16. Thus heat is supplied directly and by reflection to the contents within vessel 11 over something less than 90° of the circumference of the vessel as it is rotated.

The upper and lower extension walls 22 and 23 of the central housing member have locking keyways 30 and 31 cut through them to lock in the basket frame 12 holding cooking vessel 11 as described in detail below. These keyways 30 and 31 are oppositely disposed at the lower end of the walls which are cut away to permit key pins on the basket frame to be inserted into the keyways.

It may be desirable to be able to adjust the angle at which the cooker is positioned with respect to the horizontal. One way of accomplishing this is to provide the motor drive housing end with an adjustable foot means 35 shown in FIG. 5. This comprises a foot 36 having two or more notches 37 for engagement with pawl 38 pivotally mounted on housing 15. The foot 36 is arranged (through any well known design not shown) to slide up and down in a groove 39 in the housing wall. It is also, of course, within the scope of this invention to equip bottom end wall 19, instead of the motor drive housing end, with an adjustable foot means.

Figure 6:
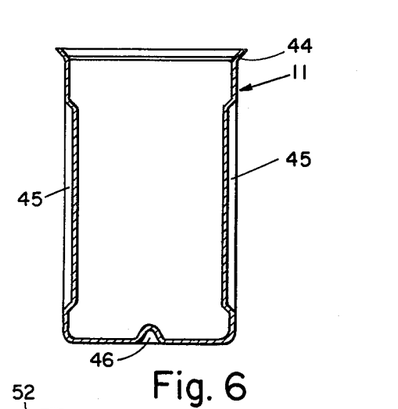
FIGS. 6 and 7 are longitudinal and transverse cross sections of the cooking vessel.
Figure 7:
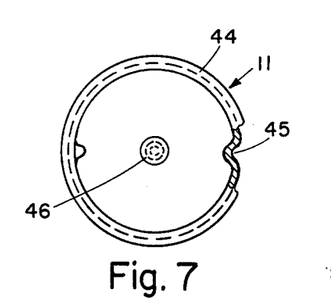

Cooking vessel 11, shown in cross sections in FIGS. 6 and 7, is of the wide-mouth type and is preferably formed of a transparent material such as a heat resistive glass. Preferably, vessel 11 has a rather pronounced flange 44 and two, oppositely disposed, longitudinally (or helically) oriented, internal lands 45 which provide means to tumble and stir the food and prevent it from sticking. On the bottom of vessel 11 is an internally directed, axially aligned indentation 46 arranged for engagement with a similarly configured projection on the basket frame 12.

Figure 8:
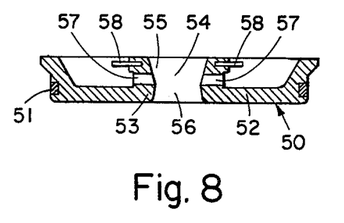
FIG. 8 is a longitudinal cross section of the lid of the cooking vessel.
Figure 9:
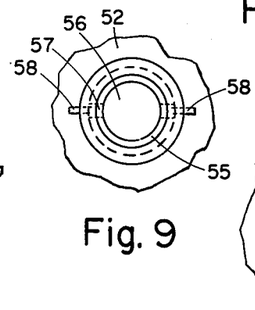
FIG. 9 is a partial end view of the lid of FIG. 8.
Figure 17:
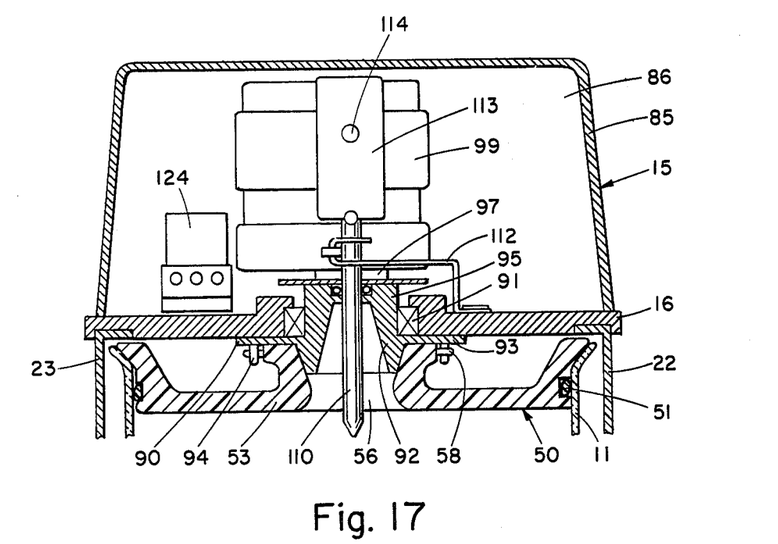
FIGS. 17 and 18 are cross sections through the driving housing, essentially at right angles to each other, showing the driving means and sensing and control means.

The cooking vessel 11 is driven through a lid 50, shown in cross section in FIG. 8, which makes a friction fit through a sealing ring 51 with the flanged end of the vessel. Lid 50 is designed to engage a driving flange (FIGS. 17 and 18) and to provide cooking vapor escape passage means. To this end, the lid 50 shown in FIGS. 8 and 9 is formed as a dish-shaped member 52 having a central core member 53. Central core member 53 has an axially aligned passage 54 having a necked cross sectional configuration, the upper section 55 of which makes contact with the driving flange and the lower section 56 of which allows for the passage of a temperature sensing probe with ample annular clearance to define a cooking vapor passage. Two oppositely disposed radial vapor discharge passages 57 are cut through the central core to provide communication between the atmosphere and central passage 54 and hence the interior of vessel 11. Affixed to the upper portion of central core 53 are oppositely positioned radially directed driving pins 58 to engage axially directed driving pins on the flange drive (FIG. 17).

Figure 10:
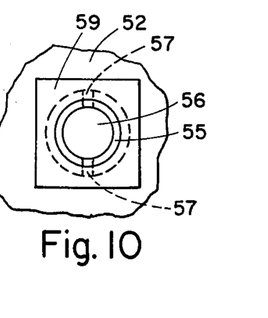
FIG. 10 is a partial end view of a modification of the lid of FIG. 9 showing an alternate configuration for the means for engaging the lid and driving means.

FIG. 10 illustrates a modification of the drive engaging means which may be used. In this modification, the central core 59, rather than being circular, is square (or of any other appropriate noncircular configuration), and the drive flange provides an engaging well of the same configuration to achieve driving engagement.

Figure 11:
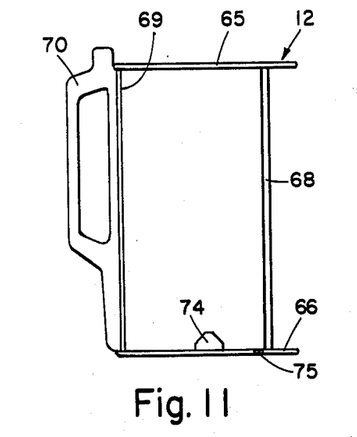
FIGS. 11 and 12 are side and top elevational views, respectively, of the basket frame used in supporting the cooking vessel.
Figure 12:
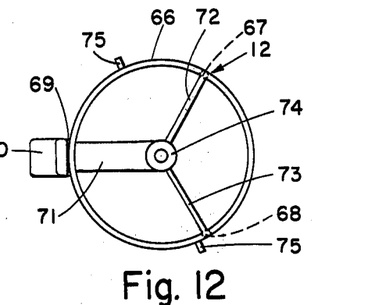

The cooking vessel is held and supported outside the cooker and supported when placed in the cooker by a basket frame 12, shown is side and top elevational views in FIGS. 11 and 12. The basket frame is formed of upper and lower rings 65 and 66 joined by three equally-spaced, vertical members 67, 68 and 69, two of which are metal rods 67 and 68 and the other of which is a metal strip 69 to which a handle 70 is bolted. Extending radially inward from metal strip 69 is a metal base strip 71 and from rods 67 and 68 are metal base rods 72 and 73. The base strip and rods provide a support for affixing an axially aligned projection 74 (formed for example of a molded plastic) which supportingly engages indentation 46 of the cooking vessel. Extending radially outward from lower ring 66 are two oppositely disposed engaging pins 75 to serve as the keys for locking basket frame 12, and hence cooking vessel 11, into the housing. As will be detailed below in the description of FIGS. 14 and 15, engaging pins 75 represent but one means for engaging and locking the basket frame into the housing.

Figure 13:
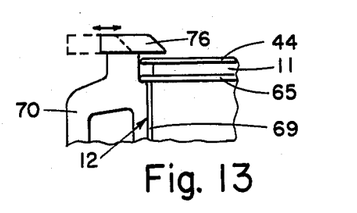
FIG. 13 is a partial longitudinal cross section of the basket frame handle having retractable clip means for holding the vessel in the basket frame while pouring from the cooking.

The basket frame remains stationary throughout the cooking cycle and handle 70 remains at room temperature allowing the hot cooking vessel to be removed from the cooker in the basket frame. Inasmuch as it may be desirable to pour hot food from the vessel, it may be desirable to equip handle 70 with a means to hold vessel 11 in frame 12 when the assembly is tipped at an angle. Retractable clip 76 shown in FIG. 13 is exemplary of such a means. By sliding clip 76 inwardly over flange 4 of the vessel, the vessel is held within basket frame 12 allowing it to be tipped. Clip 76 is retracted to the dotted line position, by sliding in a suitably designed groove (not shown) when the vessel and basket frame are placed in the cooker.

The basket frame 12 may be engaged with and locked into the housing by means other than engaging pins 75 and locking keyways 30 and 31. An alternative engaging means, illustrated in FIGS. 14 and 15, comprises a latch member 77 pivotally mounted through pin 78 in a slot 79 cut in the upper end of handle 70. Latch member 77 is urged inwardly toward vessel 11 by a torsion spring 80. When basket frame 12 is placed within the housing, latch member 77 is pulled back so that it engages a suitably configured notch 81 cut in end wall 16. This may also require some slight modification of motor drive housing. This engagement of latch member 77 and notch 81 locks the basket frame, and hence vessel 11, into the housing. Upon removal of basket frame 12 from the housing, latch member 77 is urged inwardly (as shown in the dotted lines) to extend over flange 44 of vessel 11 to hold the vessel in the basket frame when it is tipped to pour from it.

Figure 16:
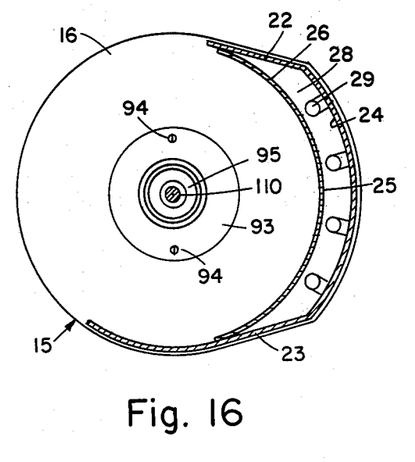
FIG. 16 is a traverse cross section of the cooker of FIG. 1 taken through plane 16—16 of FIG. 1 with the cooking vessel removed to show the driving means.
Figure 18:
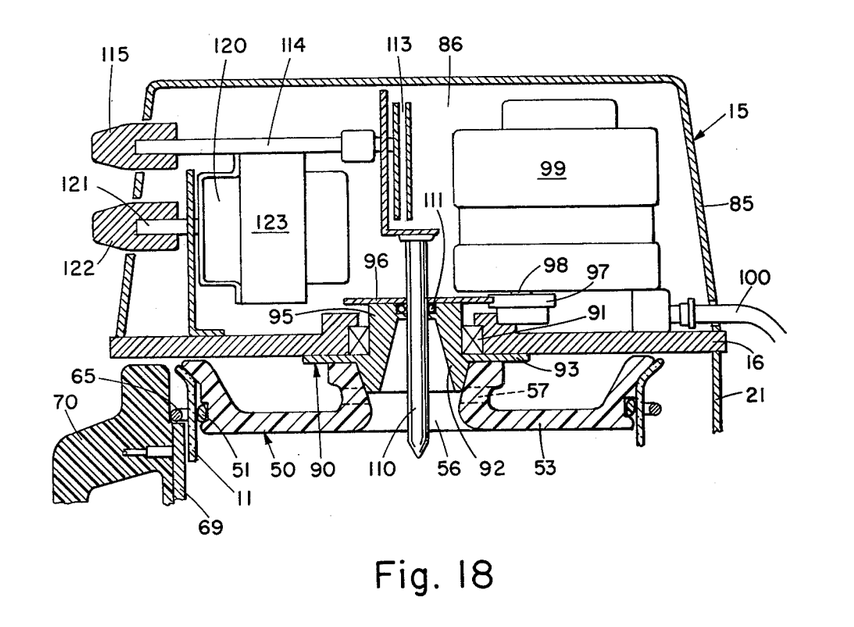
Figure 19:
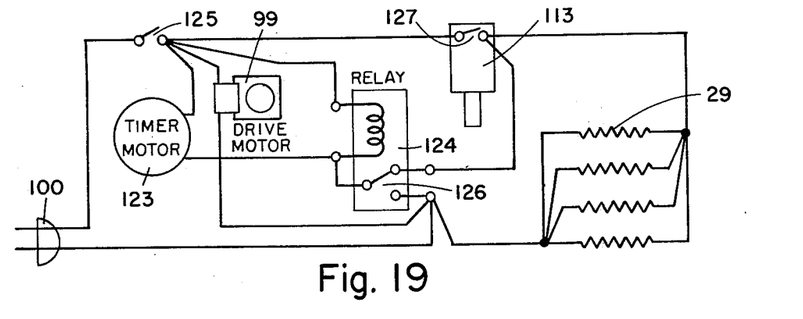
FIG. 19 is a circuit diagram for the temperature sensing and controlling means and the vessel driving means.

FIGS. 16–18 illustrate the driving means, temperature sensing means and control means of the cooker; and FIG. 19 shows the circuit diagram for their electrical connections. As noted above, motor drive housing terminates in an end wall 16. To end wall 16 is affixed housing member 85 which defines therewith an enclosed volume 86 which is isolated from the atmosphere and from any cooking vapors which may escape from vessel 11. Housing member 85 has the end configuration shown in FIG. 3.

As pointed out previously, vessel 11 is rotated through lid 50 which makes a friction seal through sealing ring 51 with the vessel wall. To accomplish this rotation there is provided a drive flange 90 mounted in end plate 16 through a bearing 91. Drive flange 90 has a frustoconical section 92 sized to fit upper section 55 of lid 50 (FIG. 8); a driving flange 93 having oppositely disposed driving pins 94, the axis of which are normal to those of driving pins 58 of the lid; and a cylindrical section 95. A vessel driving gear 96, affixed to cylindrical section 95, engages driving gear 97 mounted on shaft 98 of driving motor 99. Power to drive motor 99 is supplied through electrical conduit 100.

The vessel drive arrangement described makes it possible to locate the temperature sensing probe 110 coaxially with vessel 11, to permit cooking vapors to escape from the vessel through radial passages 57, and to seal housing volume 86 from the vapors through a sealing ring 111 located in the cylindrical section 95 of the flange drive means. Probe 110 extends into volume 86 and is held in its central position by a probe support 112 bolted to end plate 16; and the probe is connected to a bimetallic or other suitable type of thermostat 113 equipped with a rotatable shaft 114 terminating in an external knob 115 for setting it at a predetermined cooking temperature. A timer 120, having shaft 121 terminating in an external knob 122, has a timer motor 123 which is electrically connected to a power source 100 (FIG. 19) through a relay 124.

In operation, temperature knob 115 and timer knob 122 are set for the desired cooking temperature and time. Once the timer is set, main power switch 125 is automatically turned on and remains on until the prescribed cooking time is elapsed at which time the motor timer reopens it. Switch 127 which is a temperature switch making up an integral part of thermostat 113 is normally closed whereby the closing of switch 125 causes current to flow to the heater 29 and the relay coil is connected across switch 127. When switch 127 opens by virtue of the fact that the thermostat 113 has come up to the desired temperature, the relay coil is energized and switch 127 is flipped so that the coil of the relay is then connected across the line and the relay is latched so that thermostat switch 127 can open and close as is required to maintain the desired temperature. With the flipping over of switch 126, the timer motor 123 is started, i.e., timing begins when the desired temperature is first attained. Switch 126 remains in the down position for the remainder of the cooking cycle until the timer opens switch 125, thus setting the relay switch 126 back to its original position. It will be appreciated that the circuit of FIG. 19 is but one of many different circuits which can be used, that illustrated being exemplary of one using all commercially available components.

Figure 20:
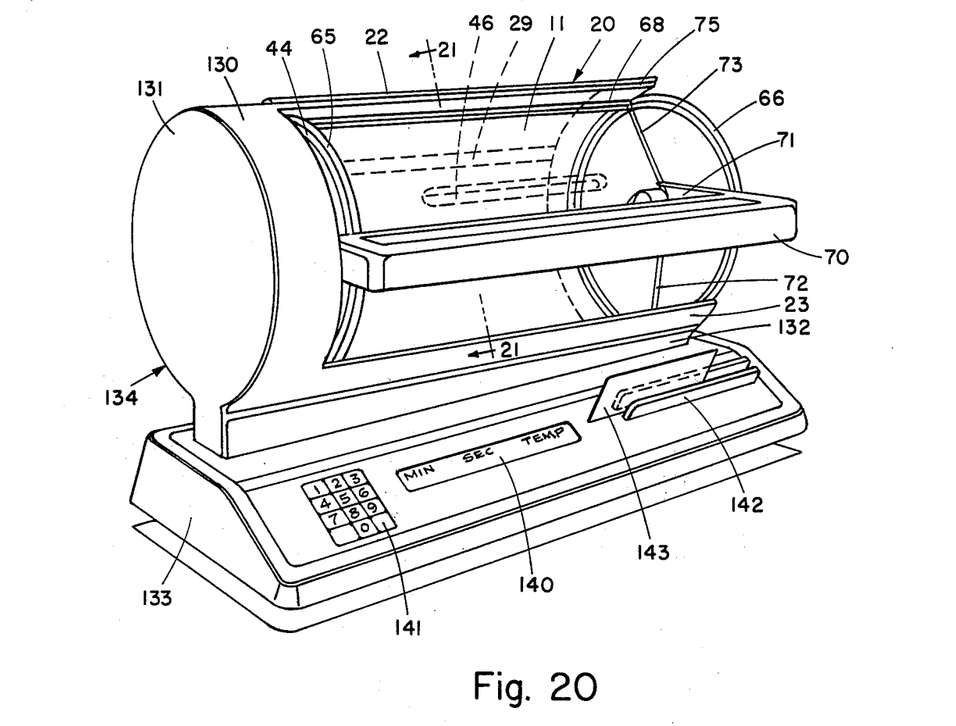
FIG. 20 is a perspective view of another embodiment of the cooker of this invention.
Figure 21:
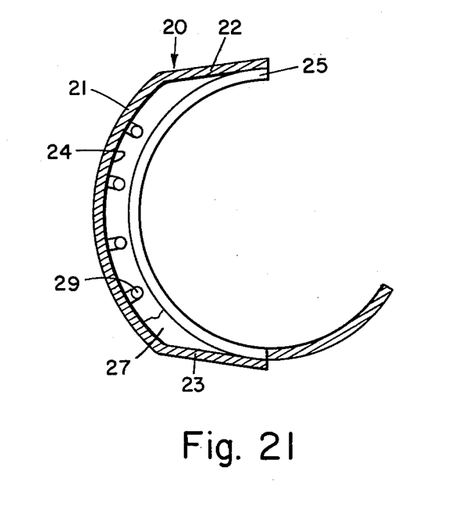
FIG. 21 is a transverse cross section through plane 21—21 of FIG. 20.
Figure 22:
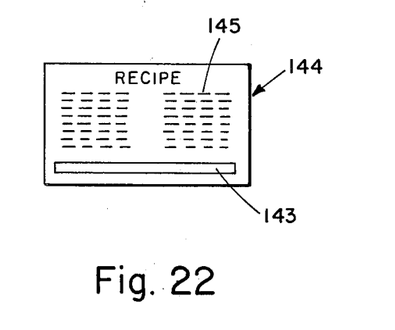
FIG. 22 shows a recipe card for use with a microprocessor control of the cooker of FIG. 20.
Figure 23:
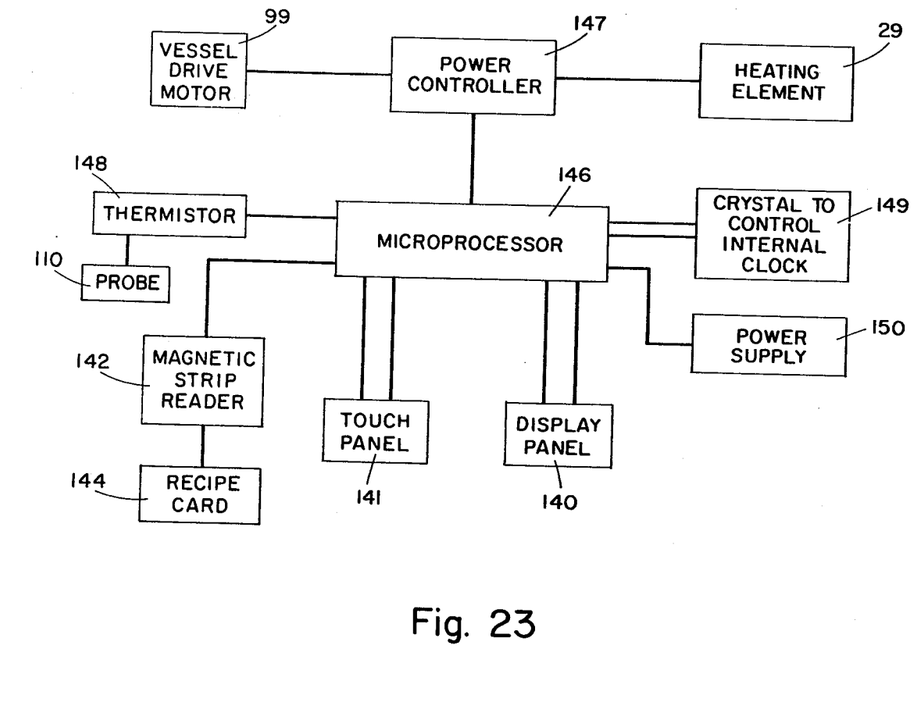
FIG. 23 is a block circuit diagram, incorporating a microprocessor, for automatically controlling a cooking protocol using the apparatus of FIG. 20.

FIGS. 20-23 illustrate another embodiment of the cooker of this invention. FIGS. 20 and 21 are perspective and cross sectional views of this cooker embodiment and FIG. 22 illustrates an encoded recipe card suitable for input to a reader such as a magnetic stripe or bar code reader device for use in conjunction with a microprocessor which effects the performance of a predetermined cooking protocol by the cooker. FIG. 23 is a clock circuit diagram showing the incorporation of a microprocessor for this purpose.

Figure 4:
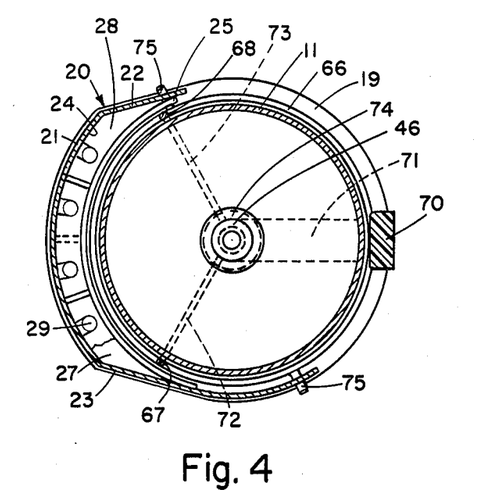
FIG. 4 is a transverse cross section of the cooker of FIG. 1 taken through plane 3—3 of FIG. 1.
Figure 5:
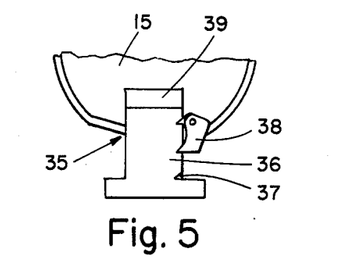
FIG. 5 is a modification of the motor-drive end of FIG. 4 illustrating the incorporation of means to adjust the angle of the cooker to the horizontal.
Figure 14:
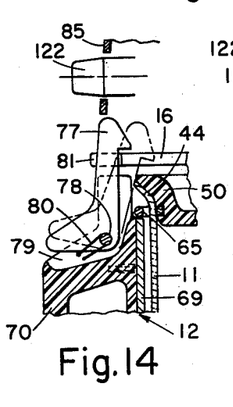
FIGS. 14 and 15 are cross sectional and top elevational views of a modification of the basket frame handle arranged to serve as the means to engage the basket frame with the housing as well as means to hold vessel in the basket frame while pouring therefrom.
Figure 15:
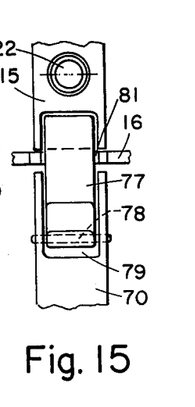

In the apparatus embodiment of FIGS. 20 and 21, the vessel 11 and basket frame 12, with handle 70 and lid 50, are essentially the same as previously described and illustrated in FIGS. 6-12. Likewise, as shown in FIG. 21, the central housing section 20 has associated with it an outer arcuate section 21 as well as upper extension wall 22 and lower extension wall 23 as shown in cross section in FIG. 4. Finally, the same heater arrangement and the same interlocking key and keyway means, or other suitable engaging and interlocing means, e.g., latching member of FIGS. 14 and 15, are incorporated in the embodiment of FIG. 20 as shown in FIGS. 1 and 4.

The housing comprises an open-ended cylindrical member 130 closed at the drive end 131 and cutaway through about 180° or less along the remainder of its length. The basket frame containing the cooking vessel may be slipped in through the open end, making it possible to provide a housing which surrounds a greater part of the vessel circumference than in the case of the embodiment of FIGS. 1 and 2. Cylindrical member 130 is affixed to or integral with a vertical support member 132 which may or may not provide for the housing, and hence for vessel 11, to be maintained at a small adjustable angle with the horizontal. Vertical support member 132 is, in turn, mounted on a base 133 which contains the control for the operation of the apparatus.

As illustrated in the block circuit diagram of FIG. 23, the embodiment of FIG. 20 is arranged to be fully automatic, if desired, having a time/temperature digital readout panel 140, a touch, key or voice energy panel 141 and an automatic data entry means such as a magnetic stripe or bar code reader 142 for reading a magnetic stripe or bar code 143 on a card 144, e.g., a card having the recipe 145 imprinted thereon (FIG. 22). The heart of the control means of this embodiment is a suitable microprocessor 146. Exemplary of such a microprocessor is one sold by Intel ® under the trade designation 8022 and identified as a single component, 8-bit, microcomputer with on-chip A/D converter having 2K of ROM and a clock generated with single resistor, inductor or crystal.

The controlling means has three primary functions: to measure elapsed time at a given temperature; to sense and control cooking temperature; and to alter the temperature according to a predetermined cooking protocol. This last named function is most often used to maintain cooked food at a lower than cooking temperature (e.g., 140° F. or 60° C.) until ready for serving.

As will be seen in FIG. 23, the vessel drive motor 99 and the heating element 29 are connected to the microprocessor 146 through a power controller 147, such as triac. A temperature transducer such as thermistor 148, connected to temperature sensing probe 110, is in turn connected to the power controller 147 through the A/D converter in microprocessor 146. A crystal 149 is used to control the microprocessor's internal clock and a power supply 150 provides the necessary electrical energy.

Using circuitry exemplified by that diagrammed in FIG. 23, it is possible to operate the cooker of FIG. 20 in one of several ways. For example, by passing the magnetic stripe 143 on recipe card 144 (or on any other suitable support) through magnetic stripe reader 142 the microprocessor is properly programmed to carry out a desired cooking protocol comprising a predetermined cycle of temperature/elapsed time segments. Alternatively, the protocol may be entered by hand using, for example, the panel 141. The digital readout panel 140 makes it possible to visually monitor the functioning of the control system. Finally, a microprocessor such as the Intel ® 8022 has on it 2K of ROM, thus making it possible to preprogram into the memories the temperature/elapsed time cooking protocols for a large number of recipes so that it is only necessary for the operator to enter manually the code number for a desired food or dish into the touch panel 141.

From the above detailed description of the apparatus of this invention it will be apparent that there is provided an automatic cooker which makes possible the preparation of a wide range of foods in a fail-safe manner. The resulting foods have been found by an expert taste panel to be equal to or superior to the same foods cooked in the more traditional manner. Thus even gourmet cooking is possible in an automatic manner, making it possible for a hostess to leave the preparation of a single dish or entire meal to the cooker of this invention.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

We claim:

1. An automatic food cooker comprising (a) an open-mouthed, rotatable cooking vessel, the bottom of which has a centrally positioned internally directed indentation;

(b) driving means to rotate said vessel;

(c) vessel lid means arranged to be directly engageable with said driving means to rotate said vessel;

(d) housing means having a drive housing end in which said driving means is located, being configured to envelope a portion of the circumference of said vessel when engaged for rotation, and having a heat reflective surface facing said vessel;

(e) vessel heating means mounted in said housing means;

(f) basket frame means surrounding said vessel and having a longitudinally extending handle, means to engage said basket frame means with said housing means to lock said vessel into engagement with said drive means, and a centrally positioned bottom projection engageable with the wall of said vessel indentation, whereby the engagement of said basket frame projection and said vessel indentation in conjunction with the engagement of said lid means with said drive means provides support for said vessel during rotation;

(g) temperature sensing means including a temperature probe extending from said drive housing through said lid means to sense the temperature of food within said vessel and to develop a signal indicative of said temperature; and (h) programable temperature/elapsed time control means responsive to said temperature to control said heater means.

2. A cooker in accordance with claim 1 wherein said vessel is formed of heat resistive glass and has internal longitudinal lands in its wall.

3. A cooker in accordance with claim 1 wherein said means to engage said basket frame means with said housing means comprises oppositely disposed locking keyways cut in said housing means and oppositely disposed key pins affixed to said basket frame means to engage said locking keyways.

4. A cooker in accordance with claim 1 wherein said means to engage said basket frame means with said housing means comprises a latch member pivotally mounted in said handle for engaging a notch in said housing.

5. A cooker in accordance with claim 4 wherein said latch member is also arranged to hold said vessel in said basket frame when said basket frame is removed from said housing.

6. A cooker in accordance with claim 1 including vessel holding means associated with the top of said handle and arranged to be engaged with the rim of said vessel thereby to hold said vessel in said basket frame means when said vessel is oriented for pouring therefrom.

7. A cooker in accordance with claim 6 wherein said vessel holding means comprises retractable clip means.

8. A cooker in accordance with claim 1 wherein said driving means comprises (1) a drive flange configured to engage said lid means, rotatable around said temperature probe and having sealing means for preventing the introduction of cooking vapor into said drive housing, said drive flange having means to engage said lid means;

(2) motor means; and (3) gear means to drivingly engage said drive flange and said motor means;

9. A cooker in accordance with claim 8 wherein said means to engage said lid means comprises oppositely disposed engaging pins extending axially from said drive flange and arranged to engage oppositely disposed radially extending pins in said lid means.

10. A cooker in accordance with claim 1 wherein said lid means comprises (1) a central core section having a central axial opening through which said temperature probe extends to define an annular passage;

(2) radial passages through said core section providing fluid communication between the interior of said vessel by way of said annular passage and the atmosphere; and (3) peripheral sealing means for frictionally engaging the internal wall of said vessel.

11. A cooker in accordance with claim 10 wherein said central core section has radially extending engaging pins arranged to engage pins axially extending from said driving means.

12. A cooker in accordance with claim 1 wherein said housing means includes supporting means to position said vessel at a small angle with respect to the horizontal.

13. A cooker in accordance with claim 12 wherein said supporting means are adjustable to attain a predetermined angle.

14. A cooker in accordance with claim 1 wherein said housing means includes end plate means and said housing envelopes up to about 180° of the circumference of said vessel.

15. A cooker in accordance with claim 1 wherein said housing means comprises (1) a central housing member formed of an outer arcuate wall providing said heat reflective surface with upper and lower extension walls joined to said arcuate wall;

(2) inner arcuate end bands defining with said central housing member oppositely disposed sections of an annular spacing; and (3) heating means support plates located within said annular spacing sections.

16. A cooker in accordance with claim 1 wherein said programable temperature/elapsed time control means comprises (1) timer means; and (2) relay means responsive to said temperature signal and arranged to actuate said timer means when said temperature sensing means detects the attainment of a predetermined temperature, whereby said elapsed time is measured from said attainment of said temperature.

17. A cooker in accordance with claim 1 wherein said programable temperature/elapsed time control means comprises (1) microprocessor means incorporating A/D converter means and an internal clock;

(2) power controller means connected to said temperature sensing means through said A/D converter means and arranged to actuate and control said driving means and said heating means;

(3) means to control said internal clock; and (4) means to program said microprocessor to perform through said power controller means a predetermined temperature/elapsed time cooking protocol.

18. A cooker in accordance with claim 17 wherein said means to program said microprocessor comprises a magnetic stripe or bar code reader to read a magnetic stripe or bar code affixed to a card substrate, a hand or voice operable panel, or a combination of said reader and said panel.

19. A cooker in accordance with claim 18 wherein said microprocessor incorporates a plurality of read-only memories, at least some of which contain stored therein accessible programs for different cooking protocols.

20. An automatic food cooker comprising a rotatable, open-mouthed cooking vessel, means to support said vessel for rotation, lid means to close said vessel, housing means, heater means external of said vessel and mounted in said housing means to apply thermal energy to food contained within said vessel, driving means to rotate said vessel, means to sense the temperature of said food and to develop a temperature signal indicative of said temperature, and programable temperature/elapsed time control means responsive to said signal to control said heater means, characterized in that said lid means is directly engageable with said driving means to rotate said vessel; the bottom of said vessel has a centrally positioned internally directed indentation; and said means to support said vessel for rotation comprises
  (a) basket frame means surrounding said vessel and having a longitudinally extending handle, means to engage and lock said basket frame means into said housing means and thus to lock said vessel into engagement with said drive means, and a centrally positioned bottom projection engageable with the wall of said vessel indentation; and
  (b) said lid means when engaged with said drive means.

21. A cooker in accordance with claim 20 wherein said means to engage and lock said basket frame means into said housing means comprises oppositely disposed locking keyways cut in said housing means and oppositely disposed key pins affixed to said basket frame means to engage said locking keyways.

22. A cooker in accordance with claim 20 wherein said means to engage and lock said basket frame means with said housing means comprises a latch member pivotally mounted in said handle for engaging a notch in said housing.

23. A cooker in accordance with claim 22 wherein said latch member is also arranged to hold said vessel in said basket frame when said basket frame is removed from said housing.

24. A cooker in accordance with claim 22 including vessel holding means associated with the top of said handle and arranged to be engaged with the rim of said vessel thereby to hold said vessel in said basket frame means when said vessel is oriented for pouring therefrom.

25. A cooker in accordance with claim 24 wherein said vessel holding means comprises retractable clip means.

26. A cooker in accordance with claim 20 further characterized in that said driving means comprises
  (1) a drive flange configured to engage said lid means, rotatable around said temperature probe and having sealing means for preventing the introduction of cooking vapor into said drive housing, said drive flange having means to engage said lid means;
  (2) motor means; and
  (3) gear means to drivingly engage said drive flange and said motor means.

27. A cooker in accordance with claim 26 wherein said driving means is directly engagable with said lid means through oppositely disposed engaging pins extending axially from said drive flange and arranged to engage oppositely disposed radially extending pins in said lid means.

28. A cooker in accordance with claim 20 wherein said lid means is further characterized as comprising
  (1) a central core section having a central axial opening through which said temperature probe extends to define an annular passage;
  (2) radial passages through said core section providing fluid communication between the interior of said vessel and the atmosphere; and
  (3) peripheral sealing means for frictionally engaging the internal wall of said vessel.

29. A cooker in accordance with claim 28 wherein said central core section has radially extending engaging pins arranged to engage pins axially extending from said driving means.

30. A cooker in accordance with claim 20 wherein said housing means are further characterized as including supporting means to position said vessel at a small angle with respect to the horizontal.

31. A cooker in accordance with claim 30 wherein said supporting means are adjustable to attain a predetermined angle.

32. A cooker in accordance with claim 20 wherein said housing means are further characterized as including end plate means and said housing envelopes up to about 180° of the circumference of said vessel.

33. A cooker in accordance with claim 20 wherein said housing means are further characterized as comprising
  (1) a central housing member formed of an outer arcuate wall providing a heat reflective surface directed toward said vessel with upper and lower extension walls joined to said arcuate wall;
  (2) inner arcuate end bands defining with said central housing member oppositely disposed sections of an annular spacing; and
  (3) heating means support plates located within said annular spacing sections.

34. A cooker in accordance with claim 20 wherein said programable temperature/elapsed time control means are further characterized as comprising
  (1) timer means; and
  (2) relay means responsive to said temperature signal and arranged to activate said timer means when said temperature sensing means detects the attainment of a predetermined temperature, whereby said elapsed time is measured from said attainment of said temperature.

35. A cooker in accordance with claim 20 wherein said programable temperature/elapsed time control means are further characterized as comprising
  (1) microprocessor means incorporating A/D converter means and an internal clock;
  (2) power controller means connected to said temperature sensing means through said A/D converter means and arranged to actuate and control said driving means and said heater means;
  (3) means to control said internal clock; and
  (4) means to program said microprocessor to perform through said power controller means a predetermined temperature/elapsed time cooking protocol.

36. A cooker in accordance with claim 35 wherein said means to program said microprocessor comprises a magnetic stripe or bar code reader to read a magnetic stripe or bar code affixed to a card substrate, a hand or voice operable panel, or a combination of said reader and said panel.

37. A cooker in accordance with claim 36 wherein said microprocessor incorporates a plurality of read only memories at least some of which contain stored therein accessible programs for different cooking protocols.

* * * * *